J. J. DEAL.
Cultivator.

No. 219,227.  Patented Sept. 2, 1879.

WITNESSES

INVENTOR

Josiah J. Deal
Per Wm. R. Singleton
Atty.

UNITED STATES PATENT OFFICE.

JOSIAH J. DEAL, OF MASSILLON, ASSIGNOR TO WILLIAM M. JOHNSTON, OF WILMOT, OHIO.

IMPROVEMENT IN CULTIVATORS.

Specification forming part of Letters Patent No. 219,227, dated September 2, 1879; application filed March 3, 1879.

*To all whom it may concern:*

Be it known that I, JOSIAH J. DEAL, of Massillon, in the county of Stark and State of Ohio, have invented certain Improvements in Cultivators, of which the following is a specification.

This invention relates to that class of cultivators attached to a frame, having a wheel in front, and the several shovels fastened to beams which are pivoted to the frame, and which are moved transversely by means of handles pivoted to them and to the frame, so that the gangs of shovels can be moved to cultivate one or more rows by widening or closing them; also to the manner of changing the direction of the cultivator-wheel, all of which will be more fully hereinafter described.

Figure 1:
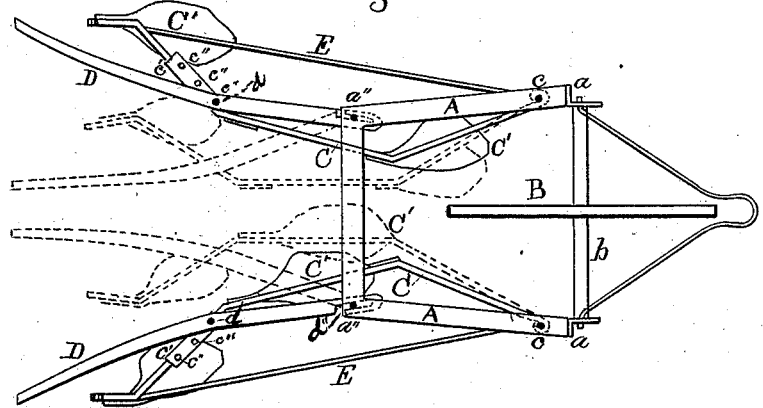
Figure 2:
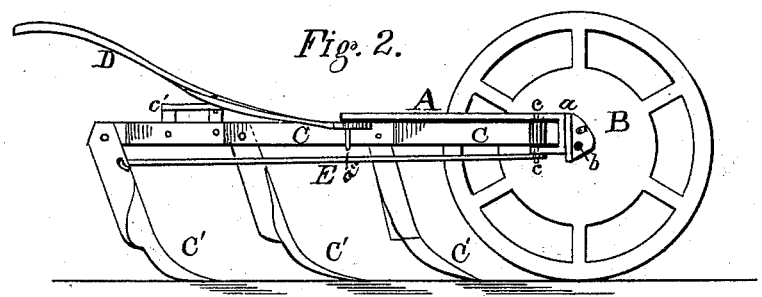
Figure 3:
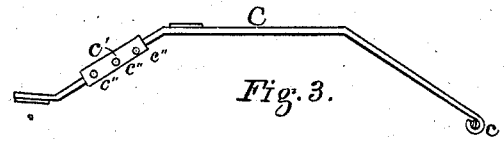
Figure 4:
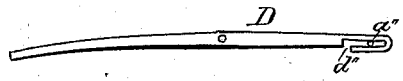

Figure 1 is a top or plan view of the cultivator. Fig. 2 is a side elevation. Figs. 3 and 4 are details of the beams and handles.

A is a frame, made of metal or wood, as may be most convenient or desirable. It is open in front, having at the ends $a\,a$ journal boxes or bearings for the axle or shaft $b$ of a wheel, B.

C C are stocks or beams, bent in the form shown in Fig. 3, and each having an eye, $c$, at one end, through which they are pivoted to the under side of the frame A, near the front end. Near the other end of each beam is a flange, $c'$, having several gage-holes, $c''\,c''$, through one of which is a pin, $d$, to hold the handles D. Attached to the beams or stocks C C are the shovels C', arranged in the usual manner.

The handles D, as seen in Fig. 4, have each a long slot, $d''$, at the front end, through which they are pivoted to the rear corners of the frame A by means of a rod, $a''$, which rod $a''$ passes transversely underneath the rear bar of the frame A, and which supports the beams C C.

The turned-up ends of rod $a''$ are used as pivots for the handles D, the long slots $d'$, permitting the lateral adjustment of the handles when moved in or out.

E E are brace-rods to sustain the shovels at the rear end of the beam.

In Fig. 1, by broken lines, is shown the closed position of the cultivator, and in solid lines the extreme expansion of the handles and beams, the purpose of which movements is to operate the cultivator for narrow or extended rows, or to cultivate one or more rows at the same time, and to change while in motion; also, by the arrangement of the pivoted handles on the rear of the frame, and the beams pivoted at the front end of the frame, and the fixed position relative to the frame of the wheel when the shovels are in the ground, by a simple movement of either handle, the direction of the wheel can be changed to the right or left, to pass any obstacle, or to change the course of the shovels when necessary.

I am aware that cultivators have been used having pivoted beams and handles, and such I do not claim, broadly; but What I do claim is—

1. In a cultivator, the handles D D, pivoted to the rear of the frame A at $d''$, in combination with the bent pivoted beams C, said handles being adjustably connected to said beams at $c'$, substantially as described.

2. In combination with the frame A, the pivoted bent beams C, the pivoted handles D, and the wheel B, journaled centrally to the front of the frame and adapted to be turned to either side by the movement of the handles, substantially as and for the purpose described.

JOSIAH J. DEAL.

Witnesses:
W. S. PUTMAN,
WM. M. JOHNSTON.